(12) United States Patent
Rylance et al.

(10) Patent No.: US 10,240,469 B2
(45) Date of Patent: Mar. 26, 2019

(54) CAST TURBOCHARGER TURBINE HOUSING HAVING GUIDE VANES

(71) Applicant: BorgWarner Inc., Auburn Hills, MI (US)

(72) Inventors: Sean Rylance, Barnsley (GB); Nathan McArdle, Bradford (GB)

(73) Assignee: BorgWarner Inc., Auburn Hills, MI (US)

(*) Notice: Subject to any disclaimer, the term of this patent is extended or adjusted under 35 U.S.C. 154(b) by 48 days.

(21) Appl. No.: 15/122,652

(22) PCT Filed: Mar. 2, 2015

(86) PCT No.: PCT/US2015/018234
§ 371 (c)(1),
(2) Date: Aug. 31, 2016

(87) PCT Pub. No.: WO2015/134351
PCT Pub. Date: Sep. 11, 2015

(65) Prior Publication Data
US 2017/0081970 A1 Mar. 23, 2017

Related U.S. Application Data

(60) Provisional application No. 61/947,542, filed on Mar. 4, 2014.

(51) Int. Cl.
*F01D 9/04* (2006.01)
*F01D 9/02* (2006.01)
*F02B 37/24* (2006.01)

(52) U.S. Cl.
CPC ............ *F01D 9/045* (2013.01); *F01D 9/026* (2013.01); *F02B 37/24* (2013.01);
(Continued)

(58) Field of Classification Search
CPC .......... F01D 9/045; F01D 9/026; F02B 37/24; F05D 2220/40; F05D 2230/21; Y02T 10/144
(Continued)

(56) References Cited

U.S. PATENT DOCUMENTS 3,005,618 A * 10/1961 Walder .................. F01D 9/045
415/184
3,112,096 A * 11/1963 Lazo ..................... F01D 9/045
415/135
(Continued)

FOREIGN PATENT DOCUMENTS

DE 19502808 A1 * 8/1996 ............ F01D 9/045
DE 102007048666 A1 * 4/2009 ............ F01D 9/026
(Continued)

OTHER PUBLICATIONS

International Application No. PCT/US2015/018234, International Search Report & Written Opinion, 11 pages, dated May 29, 2015.

*Primary Examiner* — Jason Newton
(74) *Attorney, Agent, or Firm* — Perkins Coie LLP

(57) ABSTRACT

A turbocharger (1) includes a compressor section and a cast turbine section. The turbine section includes a turbine wheel (4), and a turbine housing (11) that defines a gas inlet (13), a gas outlet (10), a volute (9) disposed between the gas inlet (13) and the gas outlet (10). The turbine housing (11) also includes vanes (20) that protrude integrally from, and have a fixed orientation relative to, an inner surface of the turbine housing (11). The turbine wheel (4) is disposed in the turbine housing (11) between the volute (9) and the gas outlet (10), and the vanes (20) are disposed in the turbine housing (11) between the turbine wheel (4) and the volute (9). A method of casting the turbine housing (11) and the vanes (20) together as a single piece is described.

12 Claims, 6 Drawing Sheets

(52) U.S. Cl.
CPC ...... *F05D 2220/40* (2013.01); *F05D 2230/21* (2013.01); *Y02T 10/144* (2013.01)

(58) Field of Classification Search
USPC ........................................................ 60/605.1
See application file for complete search history.

(56) References Cited

U.S. PATENT DOCUMENTS

| | | | | |
|---|---|---|---|---|
| 3,292,364 | A * | 12/1966 | Cazier ..................... | F01D 9/045 |
| | | | | 415/183 |
| 4,177,006 | A * | 12/1979 | Nancarrow ........... | F02B 37/025 |
| | | | | 415/151 |
| 2005/0144946 | A1* | 7/2005 | Claus ..................... | B22C 9/103 |
| | | | | 60/605.1 |
| 2007/0209361 | A1* | 9/2007 | Pedersen ................ | F01D 9/026 |
| | | | | 60/602 |
| 2009/0238691 | A1* | 9/2009 | Purdey ................... | F01D 11/04 |
| | | | | 416/174 |
| 2010/0139270 | A1* | 6/2010 | Koch ..................... | F01D 25/16 |
| | | | | 60/605.3 |
| 2010/0296924 | A1* | 11/2010 | Boning .................. | F01D 5/141 |
| | | | | 415/208.1 |
| 2011/0158803 | A1* | 6/2011 | Sebald ................... | F01D 25/16 |
| | | | | 415/229 |
| 2012/0210709 | A1 | 8/2012 | Cizek | |
| 2016/0281590 | A1* | 9/2016 | Erdel .................... | F02B 37/001 |

FOREIGN PATENT DOCUMENTS

| | | | | |
|---|---|---|---|---|
| JP | 08232895 | A * | 9/1996 | ............ F01D 9/045 |
| JP | 2003-184563 | A | 7/2003 | |
| JP | 2003184563 | A * | 7/2003 | ............ F01D 9/044 |
| JP | 2005-163692 | A | 6/2005 | |
| WO | WO 2013/112345 | A1 | 8/2013 | |
| WO | WO 2013112345 | A1 * | 8/2013 | ................ F02C 6/12 |

* cited by examiner

CAST TURBOCHARGER TURBINE HOUSING HAVING GUIDE VANES

CROSS-REFERENCE TO RELATED APPLICATIONS

This application claims priority to and all the benefits of U.S. Provisional Application No. 61/947,542, filed on Mar. 4, 2014, and entitled "A Cast Turbocharger Turbine Housing Having Guide Vanes," which is incorporated herein by reference.

BACKGROUND

Field of the Invention

This invention relates to a cast turbocharger turbine housing having cast-in-place guide vanes. The vanes guide the exhaust gas flow toward the turbine wheel at specific angles.

Description of Related Art

Turbochargers may include a turbine housing connected to the engine's exhaust manifold, a compressor housing connected to the engine's intake manifold, and a center bearing housing coupling the turbine and compressor housings together. A turbine wheel in the turbine housing is rotatably driven by an inflow of exhaust gas supplied from the exhaust manifold. A shaft rotatably supported in the center bearing housing connects the turbine wheel to a compressor wheel in the compressor housing so that rotation of the turbine wheel causes rotation of the compressor wheel. The shaft connecting the turbine wheel and the compressor wheel defines an axis of rotation. As the compressor wheel rotates, it increases the air mass flow rate, airflow density and air pressure delivered to the engine's cylinders via the engine's intake manifold.

Turbochargers deliver compressed air to an engine intake, allowing more fuel to be combusted, thus boosting an engine's horsepower without significantly increasing engine weight. Thus, turbochargers permit the use of smaller engines that develop the same amount of horsepower as larger, normally aspirated engines. Using a smaller engine in a vehicle has the desired effect of decreasing the mass of the vehicle, increasing performance, and enhancing fuel economy. Moreover, the use of turbochargers permits more complete combustion of the fuel delivered to the engine, which contributes to the highly desirable goal of a cleaner environment.

SUMMARY

In some aspects, a turbocharger includes a compressor section and a cast turbine section. The turbine section includes a turbine wheel and a turbine housing. The turbine housing defines a gas inlet, a gas outlet, a volute disposed between the gas inlet and the gas outlet, and vanes that protrude integrally from, and have a fixed orientation relative to, an inner surface of the turbine housing. The turbine wheel is disposed in the turbine housing between the volute and the gas outlet, and the vanes are disposed in the turbine housing between the turbine wheel and the volute.

The turbocharger may include one or more of the following features: The fixed vanes are configured to redirect a flow of exhaust gas within the turbine housing from a first flow direction to a second flow direction that is at an angle relative to the first flow direction. The angle is the same for each vane. The angle for at least one vane is different than the angle for other vanes. The angle between the first flow direction and the second flow direction is in a range of 100 degrees and 170 degrees. Each vane has the same cross-sectional shape. At least one vane has a cross-sectional shape that is different than the cross-sectional shape of other vanes. Each vane is oriented so as to provide gas flow redirection from a first flow direction that is generally circumferential relative to the turbine wheel to a second flow direction that is more radially oriented than the first flow direction. At least one vane provides more exhaust gas redirection than other vanes. The turbocharger includes a bypass passage that extends between the gas inlet and the gas outlet and bypasses the turbine wheel, and a wastegate valve disposed in the bypass passage.

In some aspects, a single-piece turbine housing of a turbocharger is formed by a casting process. The turbine housing includes integral, fixed vanes. The method comprises the following steps: making a pattern of the turbine housing including integral, fixed vanes; dipping the pattern into a slurry of fine refractory material containing a binder; coating the dipped pattern with coarse ceramic particles; allowing the dipped, coated pattern to harden, forming a hardened mold; pouring molten metal into the hardened mold to form the turbine housing including integral, fixed vanes; and removing the turbine housing including integral, fixed vanes from the hardened mold. In some embodiments, the pattern is formed of foam. The pattern provides a turbine housing that defines a gas inlet, a gas outlet, and a volute disposed between the gas inlet and the gas outlet, and the vanes protrude integrally from an inner surface of the turbine housing at a location that is adjacent to the volute.

Vanes are used in turbochargers to control the angle at which the exhaust gas is directed to the turbine wheel. A simple, low cost turbocharger is described that includes a fixed vane assembly which is part of the turbine housing. In particular, the vanes are cast integrally with the turbine housing as part of the process used to produce the cast turbine housing. The vanes are used to direct the exhaust gas to the turbine wheel at the proper angle, whereby an efficient operation of the turbine wheel is achieved. In addition, the vanes may be used to allow a turbine wheel to come to the proper speed quickly and to avoid rotating faster than design limits. By casting the vanes integrally with the turbine housing, manufacture of the vanes becomes simplified and reduced in cost relative to some conventional turbine housings in which the vanes are manufactured separately and then attached to the turbine housing, and/or in which the vanes are generally part of complex assemblies.

BRIEF DESCRIPTION OF THE DRAWINGS

Advantages of the present invention will be readily appreciated with reference to the following detailed description when considered in connection with the accompanying drawings wherein.

DETAILED DESCRIPTION

Figure 1:
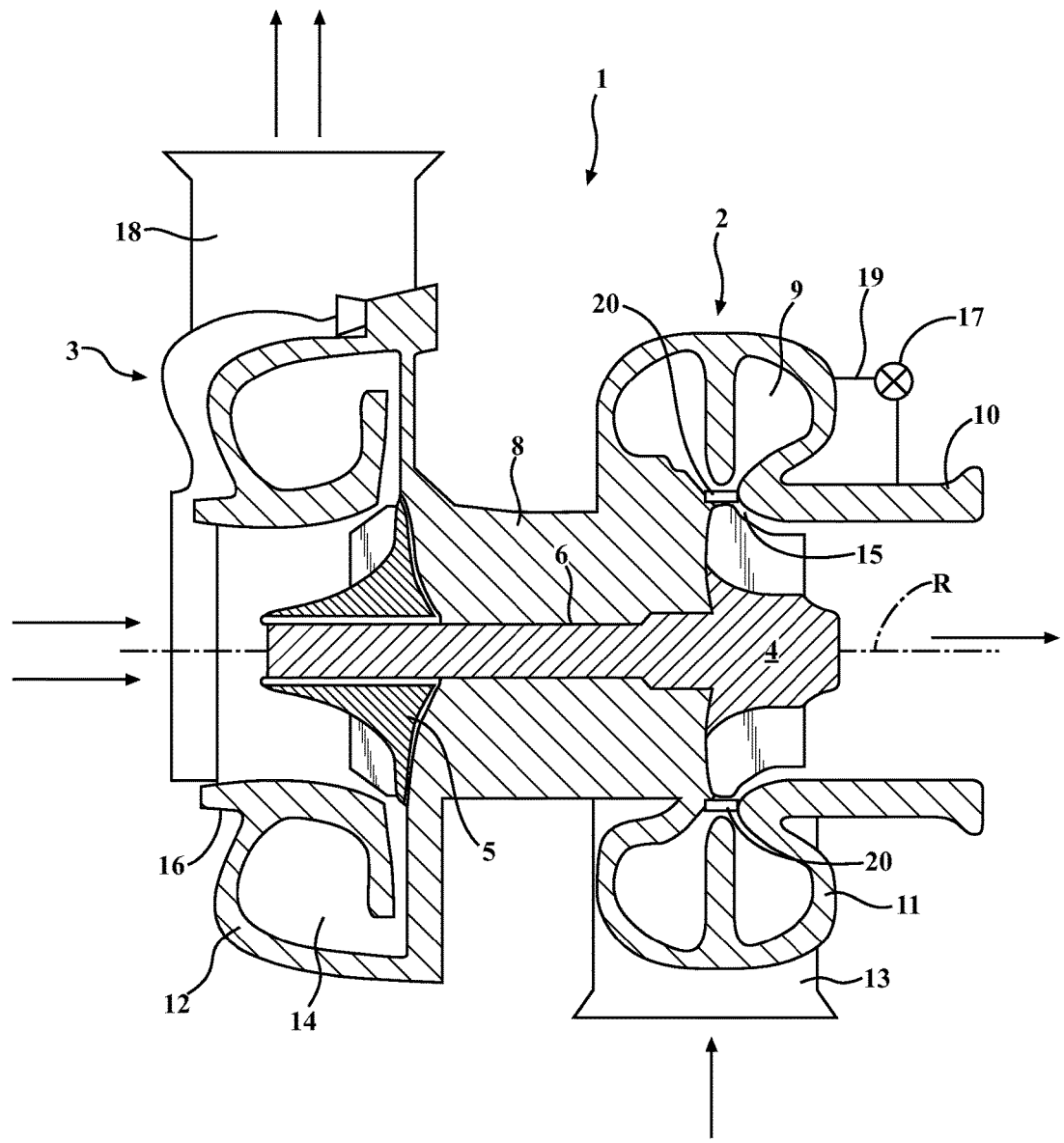
FIG. 1 is a schematic cross-sectional view of an exhaust gas turbocharger including a cast turbine housing having cast-in-place vanes.

Referring to FIG. 1, an exhaust gas turbocharger 1 includes a turbine section 2, the compressor section 3, and a center bearing housing 8 disposed between and connecting the compressor section 3 to the turbine section 2. The turbine section 2 includes a turbine housing 11 that defines an exhaust gas inlet 13, an exhaust gas outlet 10, and a twin volute 9 disposed in the fluid path between the exhaust gas inlet 13 and exhaust gas outlet 10. A turbine wheel 4 is disposed in the turbine housing 11 between the twin volute 9 and the exhaust gas outlet 10. The twin volute 9 conducts the exhaust gas to the turbine wheel 4. Integrally-cast vanes 20, discussed further below, are distributed around a gas discharge area 15 between the twin volute 9 and the turbine wheel 4, and serve to direct gas flow toward the turbine wheel 4 at a desired angle.

The compressor section 3 includes a compressor housing 12 that defines the air inlet 16, an air outlet 18, and a compressor volute 14. A compressor wheel 5 is disposed in the compressor housing 12 between the air inlet 16 and the compressor volute 14. The compressor wheel 5 is fixed to a shaft 6 that connects the turbine wheel 4 to the compressor wheel 5. The shaft 6 is supported for rotation about a rotational axis R within in the bearing housing 8.

In use, the turbine wheel 4 in the turbine housing 11 is rotatably driven by an inflow of exhaust gas supplied from the exhaust manifold of an engine. Since the shaft 6 is rotatably supported in the center bearing housing 8 and connects the turbine wheel 4 to the compressor wheel 5 in the compressor housing 12, the rotation of the turbine wheel 4 causes rotation of the compressor wheel 5. As the compressor wheel 5 rotates, it increases the air mass flow rate, airflow density and air pressure delivered to the engine's cylinders via an outflow of air from the compressor air outlet 18, which is connected to the engine's air intake manifold (not shown).

Figure 2:
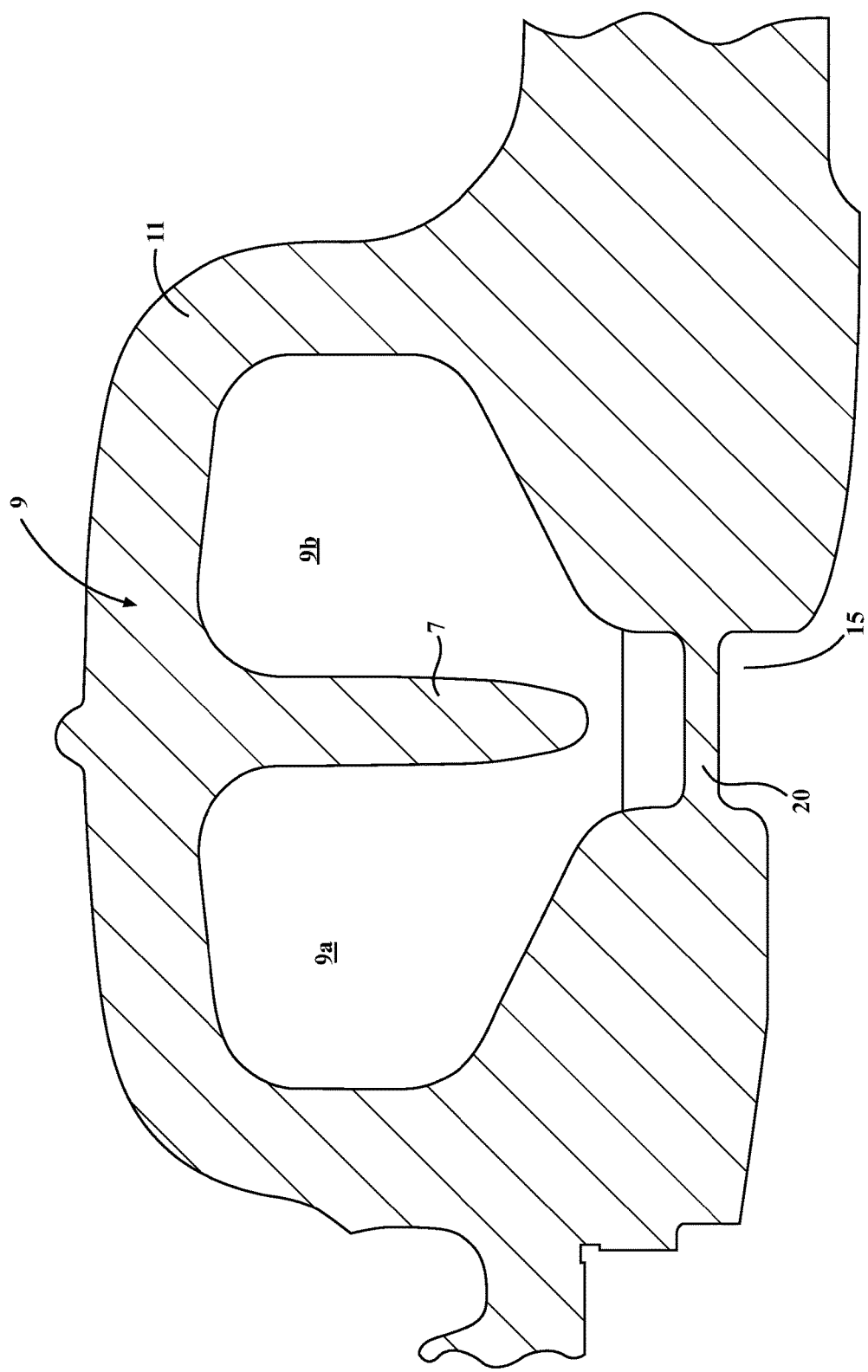
FIG. 2 is an enlarged cross-sectional view of a portion of the turbine housing of FIG. 1, showing the position of the turbine vanes relative to the twin volute.
Figure 3:
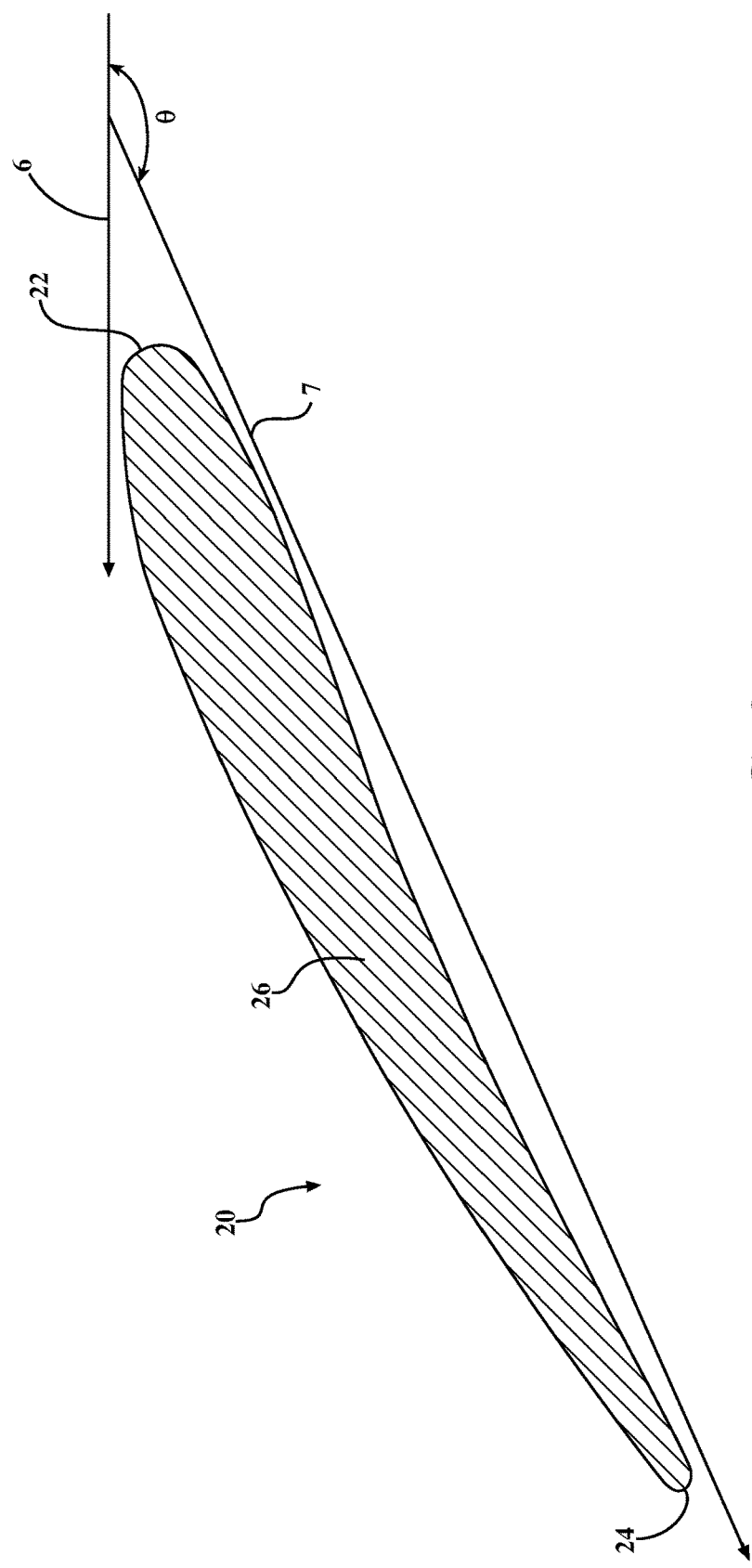
FIG. 3 is a cross-sectional view of a single vane.
Figure 4:
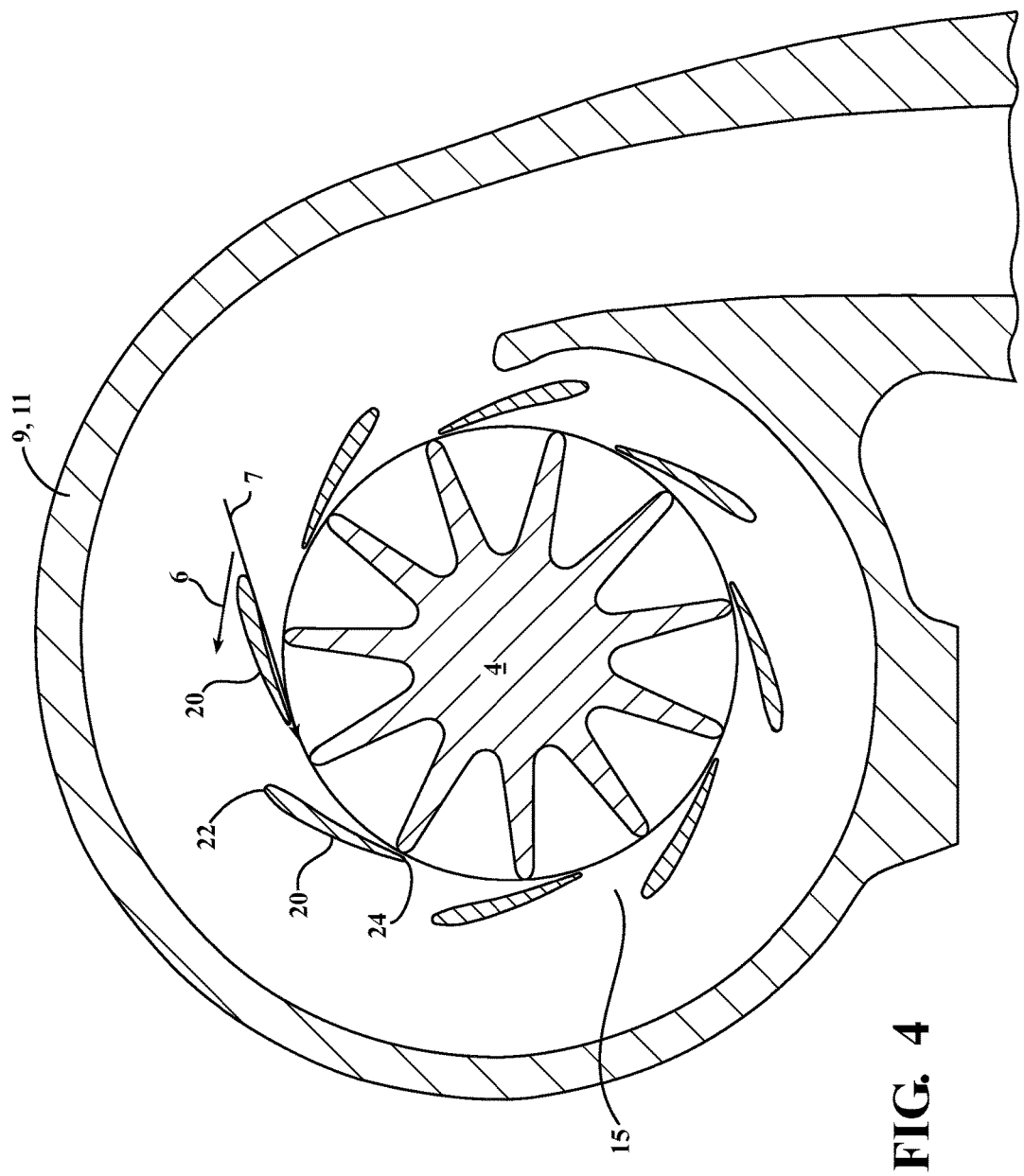
FIG. 4 is a cross sectional view of the volute illustrating an exemplary vane configuration.

Referring to FIGS. 2-4, vanes 20 are disposed in the gas discharge area 15 between the twin volute 9 and the turbine wheel 4. The vanes 20 are cast-in-place within the wall of the turbine housing 11, and thus have a fixed orientation relative to the turbine housing. In some embodiments, the vanes 20 extend between opposed inner surfaces of the turbine housing 11 (FIG. 2). Each vane 20 has the shape of an airfoil, including a rounded leading edge 22 and an opposed, rounded trailing edge 24 that are tapered relative to a mid-region 26 of the vane 20. The leading edge 22 of the vane 20 is positioned below the divider wall 7 of the twin volute 9, and is oriented so that the exhaust gas impinges on the leading edge 22.

Prior to reaching the vanes 20, the exhaust gas discharged from the engine passes through each volute 9a, 9b of the twin volute 9. The original direction of exhaust gas flow, indicated by the arrow 6 (FIG. 3), generally follows the arcuate shape of the volute 9, and thus travels generally circumferentially (e.g., in a direction that is generally tangential to an outer diameter of the turbine wheel 4). The placement and orientation of the vanes 20 in the gas discharge area 15 serves to redirect the exhaust gas flow in a more inward direction (e.g., in a more radial direction) toward the turbine wheel 4, for example in the direction shown by the arrow 7 (FIG. 3). For example, after being redirected by the vane 20, the exhaust gas flow direction is changed by an angle (e.g., the angle between arrow 6 and arrow 7) toward the rotational axis R.

Since the vanes 20 are cast at an angle relative to the original circumferential direction of air flow, the vanes 20 turn the exhaust gas stream so that it is directed toward surfaces of blades of the turbine wheel 4. Due to the airfoil shape of the vane 20, the re-direction of the gas flow results in only a small increase the turbulence of the exhaust gas. Because the vane 20 does not appreciably increase the turbulence of the exhaust gas, it does not cause a major increase in back pressure in the exhaust system when the turbocharger 1 is operating in a region of optimum performance.

Figure 5:
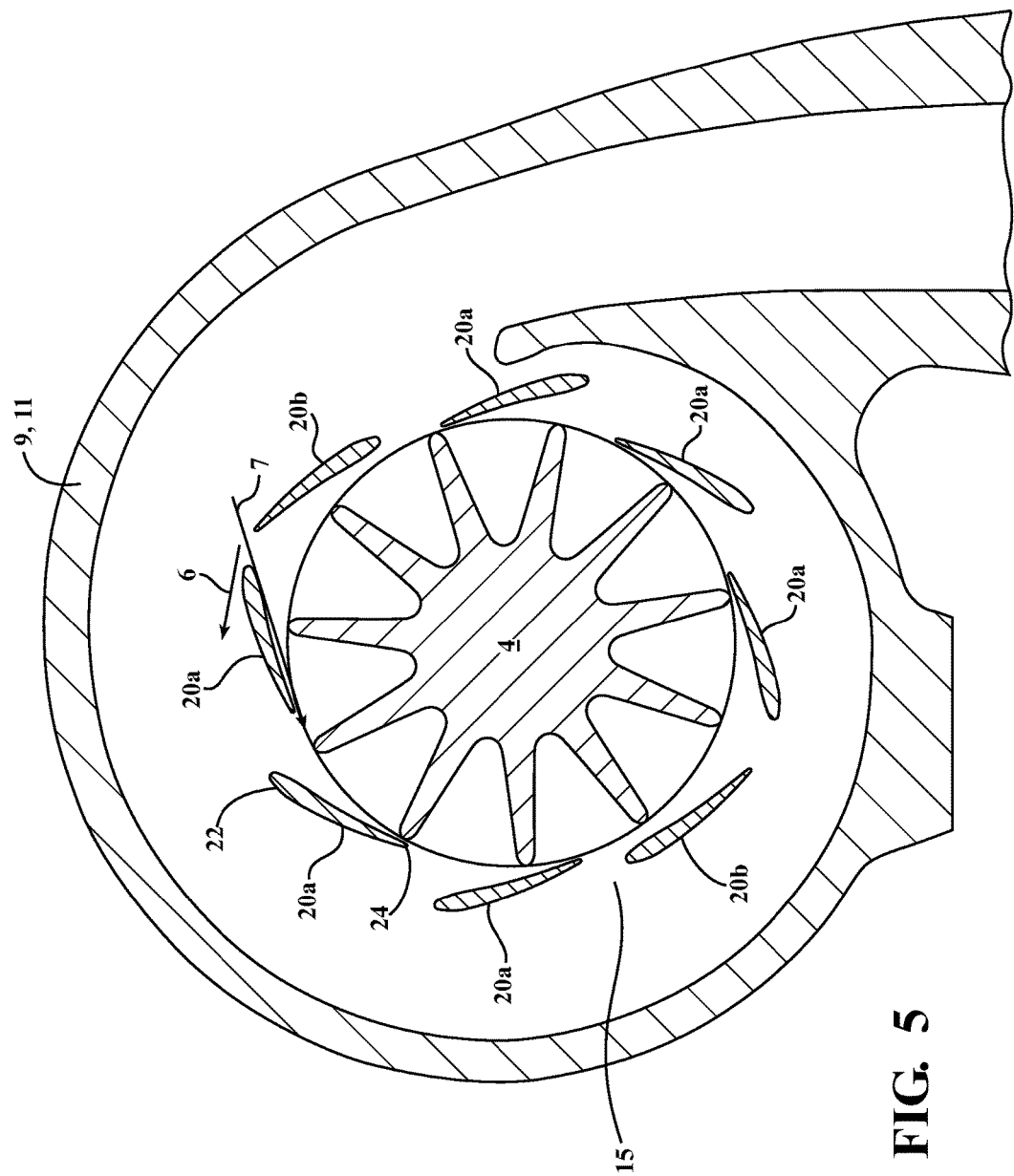
FIG. 5 is a cross sectional view of the volute illustrating another exemplary vane configuration.

The optimal angle between the original direction 6 of exhaust gas travel and the modified direction 7 of the exhaust gas after it has been turned by the vane 20 varies depending upon the design of the turbine wheel 4, volute 9 design and engine operating conditions. Generally, the angle is in a range from about 100 degrees to about 170 degrees. However, the turbine housing 11 may be cast with vanes 20 at any desired angle. For example, the vanes 20 could be positioned to provide angles between the original direction 6 of exhaust gas travel and the modified direction 7 of exhaust gas travel after it has been turned by the vane 20 of in a range of between 160 and 110 degrees, or 150 to 120 degrees, or 140 to 130 degrees. An angle of 170 degrees indicates a small change in the direction of exhaust gas travel while an angle of 100 degrees indicates a larger change in the direction exhaust gas travel. Each vane 20 may be oriented at the same angle (FIG. 4), or one or more of the vanes 20b may be oriented at a different angle, with some vanes 20a providing more exhaust gas redirection, and other vanes 20b providing less redirection (FIG. 5).

The turbine wheel 4 operates in a high temperature environment and may reach temperatures as high as 1922° F. (1050° C.). In addition, the turbine wheel 4 rotates very fast. The rotation speed of a turbine wheel is size dependent, and smaller turbine wheels can rotate faster than larger wheels. A small turbocharger turbine wheel, used in conjunction with an internal combustion engine, may reach rotational velocities as high as 350,000 RPM. The rapid rotation of the turbine wheel creates large centrifugal forces or centrifugal stress on the turbine wheel. Accordingly, it is important to prevent the turbine wheel 4 from rotating faster than its design limits. The energy imparted to the turbine wheel 4 by the exhaust gas varies with the angle at which the exhaust gas is directed. For a radial flow turbine wheel, the exhaust gas provided to the turbine wheel varies with the angle at which the gas strikes the turbine wheel. For a radial flow turbine wheel, the maximum energy is provided when the exhaust gas strikes the turbine wheel radially. However, in many cases having the full force of the exhaust gas directed to the turbine wheel could cause the turbine wheel to rotate faster than desired, and thus create excessive pressure boost. The fixed vanes 20 in the volute 9 may be set to produce an incident angle of the exhaust gas to the turbine wheel 4 which is ideal for a desired operating point. In some embodiments, the turbocharger 1 may also include a wastegate 17 to relieve exhaust gas pressure when necessary. For example, the wastegate 17 may be disposed in a bypass passageway 19 that connects the exhaust gas inlet 13 to the exhaust gas outlet 10 and bypasses the turbine wheel 4 (shown schematically in FIG. 1). When the vanes 20 cast in the exhaust gas volute 9 are combined with a wastegate, the maximum speed of the turbine wheel may be more accurately controlled.

The number of vanes 20 in the turbine housing 11 can vary depending upon the size of the vanes 20 and how closely they are spaced. The size, number, spacing, and pitch of the vanes 20 may be varied for specific applications. It has been found convenient to have from eight to eleven equidistantly-spaced vanes 20 surrounding the gas discharge area 15 (FIG. 4), although it is possible to have less. Within the turbine housing 11, the individual vanes 20 need not redirect the exhaust gas to the same angle.

The cast turbine housing 11 may be used in a turbocharger for a gasoline or diesel engine in applications where the cost and complexity of a movable vane turbocharger is not desirable. In some embodiments, the fixed vanes 20 may be set at an angle or angles which fall within the range of vane angles used by a movable vane turbocharger.

The turbine housing 11 is also useful in turbochargers for fixed engine speed applications, such as electrical generators. In these applications, the engine is run at a constant speed and a relatively constant load. The vanes 20 of the turbine housing 11 may be set at an angle which is optimal for the engine speed and the load.

Accordingly, the vanes 20 in the turbine housing 11 are cast integrally (e.g., as a single unit) with the turbine housing 11. Investment casting processes, such as lost-wax casting, or lost-foam casting, are suitable for forming the metal turbine housing 11.

The investment casting process uses a mold made around a form or pattern. The pattern need not be the same material as final object. For example, lost-wax casting employs a pattern formed of wax (i.e., beeswax), while lost-foam casting employs a pattern formed of foam (i.e., polystyrene foam). There are many types of waxes and foams which can be used, and any other readily removable material which can be fashioned into the desired shape may be used to produce the pattern, even low melting metals. When forming the pattern of the turbine housing 11, it is advantageous to use foam as the pattern material, and to use the foam pattern in a lost foam casting process, since this process is suitable for making complex castings, and the end results are dimensionally accurate, have a good surface finish, and no parting lines are formed in the end product. The investment casting process may be either a direct process or an indirect process. The direct process uses the pattern itself as the basis for the formation of the investment. The indirect process uses the pattern to create multiple wax copies of the form.

Figure 6:
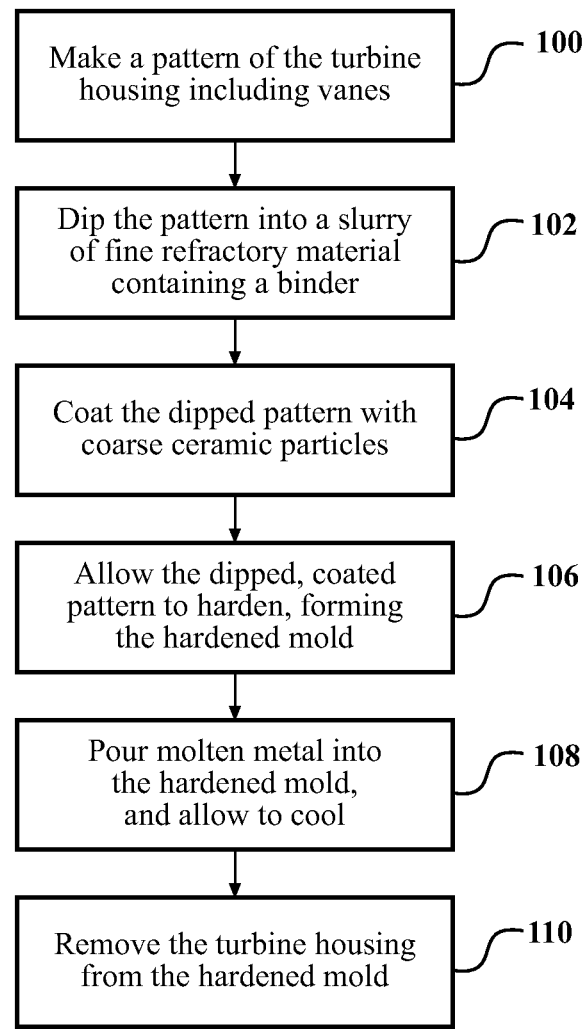
FIG. 6 is a flow chart illustrating the investment casting process used to form the turbine housing with cast-in vanes.

Referring to FIG. 6, the first step (100) of the process of investment casting the turbine housing 11 includes making a pattern of the turbine housing 11 having the vanes 20 arranged in the gas discharge area 15. For example, the pattern is made of polystryrene foam. Once the pattern is made, the pattern is used to create a ceramic mold. The ceramic mold is produced in steps 102-106, as follows:

In the second step (102), the pattern is dipped into a slurry of fine refractory material containing a binder. The excess slurry is allowed to drain off, producing a smooth, uniform surface on the exterior of the pattern.

In the third step (104), the dipped pattern is coated with coarse ceramic particles, for example by dipping. The coarse ceramic material also contains a binder. It is desirable to have a mold that is approximately 5 to 15 mm thick. If the mold is not sufficiently thick after the fine and course dipping, the dipping and coating steps may be repeated until the proper thickness is achieved.

In the fourth step (106), the dipped, coated pattern is allowed to harden into a mold. In particular, the dipped, coated pattern is allowed to dry, and is then heated to cause the ceramic particles and binder to bond together. In a lost-wax casting process in which the pattern is formed of wax, the heat is also used to remove the wax pattern from the mold.

In the fifth step (108), molten metal is poured into the hardened mold and allowed to cool to form turbine housing 11. In some embodiments, the molten metal is gray iron. The investment casting process is well suited to casting gray iron, a metal which is often used in the turbine housing of a turbocharger. It is understood, however, that the material selection is not limited to gray iron.

In a lost-foam casting process, the foam pattern remains in place within the mold, and the molten metal is poured onto the foam, which evaporates as the molten metal enters the mold.

In the sixth step (110), the turbine housing 11 is removed from the mold, for example by destroying the mold.

Because the turbine housing 11 and the vanes 20 are cast together as a single piece, manufacturing costs are reduced due to both reduced cost and complexity of the components, and to the reduced cost of assembly of the components.

Although the cast-in vanes 20 are described herein as being integrally formed with a twin volute turbine housing 11, the vanes 20 can also be integrally formed in other types of turbine housings, including single volute housings and multiple volute housings of various configurations. Within the tooling process, the vanes 20 can be cast at various angles, and the angle can vary from vane to vane. In addition, or alternatively, the vanes 20 may be formed on a scroll to follow the volute scroll, and more than one vane shape can be used within the same turbine housing.

A selected illustrative embodiment of the invention is described above in some detail. It should be understood that only structures considered necessary for clarifying the present invention have been described herein. Other conventional structures, and those of ancillary and auxiliary components of the system, are assumed to be known and understood by those skilled in the art. Moreover, while a working example of the present invention has been described above, the present invention is not limited to the working example described above, but various design alterations may be carried out without departing from the present invention as set forth in the claims.

What is claimed:

1. A turbocharger (1) including a compressor section (3) and a cast turbine section (2), the turbine section (2) comprising
 a turbine wheel (4), and a turbine housing (11) that defines a gas inlet (13), a gas outlet (10), a volute (9) disposed between the gas inlet (13) and the gas outlet (10), and vanes (20) arranged in a plane that protrude integrally from, and have a fixed orientation relative to, two opposed inner surfaces of the turbine housing (11),
 wherein the turbine wheel (4) is disposed in the turbine housing (11) between the volute (9) and the gas outlet (10), and the vanes (20) are disposed in the turbine housing (11) between the turbine wheel (4) and the volute (9), and at least one vane of the vanes (20) has a cross-sectional shape that is different than the cross-sectional shape of at least a different one of the vanes (20).

2. The turbocharger (1) according to claim 1, wherein the vanes (20) are configured to redirect a flow of exhaust gas within the turbine housing (11) from a first flow direction to a second flow direction that is at an angle ($\theta$) relative to the first flow direction.

3. The turbocharger (1) according to claim 2, wherein the angle ($\theta$) is the same for each of the vanes (20).

4. The turbocharger (1) according to claim 2, wherein the angle (θ) for at least one vane (20b) of the vanes is different than the angle (θ) for at least a different one of the vanes (20a).

5. The turbocharger (1) according to claim 2, wherein the angle (θ) between the first flow direction and the second flow direction is in a range of 100 degrees and 170 degrees.

6. The turbocharger (1) according to claim 1, wherein each of the remaining vanes (20) has the same cross-sectional shape.

7. The turbocharger (1) according to claim 1, wherein each vane (20) is oriented so as to provide gas flow redirection from a first flow direction that is circumferential relative to the turbine wheel (4) to a second flow direction that is more radially oriented than the first flow direction.

8. The turbocharger (1) according to claim 1, wherein at least one vane (20a) of the vanes provides more exhaust gas redirection than at least a different one of the vanes (20b).

9. The turbocharger (1) according to claim 1, further comprising a bypass passage (19) that extends between the gas inlet (13) and the gas outlet (10) and bypasses the turbine wheel (4), and a wastegate valve (17) disposed in the bypass passage (19).

10. A method of forming a cast, single-piece turbine housing including integral, fixed vanes (20), wherein the method comprises the following steps:
    making a pattern of the turbine housing (11);
    dipping the pattern into a slurry of fine refractory material containing a binder;
    coating the dipped pattern with coarse ceramic particles;
    allowing the dipped, coated pattern to harden, forming a hardened mold; pouring molten metal into the hardened mold to form the turbine housing (11) including integral, fixed vanes (20); and
    removing the turbine housing (11) including integral, fixed vanes (20) from the hardened mold.

11. The method of claim 10, wherein the pattern is formed of foam.

12. The method of claim 10, wherein the pattern provides the turbine housing (11) with a gas inlet (13), a gas outlet (10), and a volute (9) disposed between the gas inlet (13) and the gas outlet (10), and the vanes (20) protrude integrally from an inner surface of the turbine housing (11) at a location that is adjacent to the volute (9).

* * * * *